United States Patent [19]

Huschka et al.

[11] 4,013,760

[45] Mar. 22, 1977

[54] PROCESS FOR THE PRODUCTION OF ISOTROPIC PYROLYTIC CARBON PARTICLES

[75] Inventors: Hans Huschka, Grossauheim; Franz-Josef Herrmann, Rodenbach, both of Germany

[73] Assignee: HOBEG Hochtemperaturreaktor-Brennelement GmbH, Grossauheim, Germany

[22] Filed: July 11, 1974

[21] Appl. No.: 487,786

[30] Foreign Application Priority Data

July 30, 1973  Germany .................. 2338562

[52] U.S. Cl. .................. 423/449; 106/307; 260/37 R; 423/448
[51] Int. Cl.$^2$ .................. C01B 31/02; C01B 31/04
[58] Field of Search .......... 423/448, 449, 454, 458, 423/445; 106/307; 264/29; 427/213, 249; 260/37 R

[56] References Cited

UNITED STATES PATENTS

| | | | |
|---|---|---|---|
| 3,406,227 | 10/1968 | Tully et al. | 427/249 |
| 3,547,676 | 12/1970 | Bokros et al. | 423/458 X |
| 3,812,240 | 5/1974 | Whittaker et al. | 423/448 |
| 3,869,302 | 3/1975 | Shea et al. | 264/29 X |

FOREIGN PATENTS OR APPLICATIONS 2,217,674  10/1972  Germany .................. 106/307

OTHER PUBLICATIONS

Beatty et al. "11th Biennial Conference on Carbon" June 4–8, 1973, pp. 30 & 31.

Primary Examiner—Edward J. Meros
Attorney, Agent, or Firm—Cushman, Darby & Cushman

[57] ABSTRACT

Graphite or carbon molded articles of high isotropy and high heat conductivity, especially useful for high temperature reactor fuel elements are prepared by pressing a mixture of a binder and a powdery carbon filler which consists partially or wholly of pyrolytically produced isotropic carbon with subsequent heat treatment of the pressed article. There is used as the filler an isotropic pyrolytic carbon made by depositing a hydrocarbon on a carbon granulate and then grinding to a particle size of less than 100 μm.

9 Claims, No Drawings

PROCESS FOR THE PRODUCTION OF ISOTROPIC PYROLYTIC CARBON PARTICLES

The invention concerns a process for the production of graphite molded articles of high isotropy and high heat conductivity suitable for use in high temperature reactor-fuel elements by pressing a mixture of a binder and a carbon filler which has been produced pyrolytically.

Fuel elements for high temperature reactors consist of structural graphite (prefabricated graphite molded articles which are brought into the final form by mechanical working after heating to about 2800° C.) or of matrix graphite (molded articles of binder containing graphite powder formed by pressing and brought to about 2000° C. to carbonize the binder) in which the fuel and fissile (breeder) material is embedded in the form of coated particles. This is true for all types of spherical and prismatic high temperature fuel elements. Several of these types of fuel elements, as, for example, the molded spherical THTR-fuel element, the directly cooled cylindrical fuel compacts or the molded-shaped fuel element were produced by direct premolding of binder containing graphite molding powder and coated particles and subsequent carbonization and high temperature treatment. Thereby arise problems which are difficult to overcome resulting from the peculiar character of the graphite molding powder in molding to form strongly anisotropic structures. The graphite molding powder customarily consists of natural graphite and/or artificial graphite powder and/or powdered coke and a binder. Attempts have been made to overcome these problems of the anisotropy, for example, by quasiisostatically molding the spherical fuel elements in rubber forms or preforming a so-called isogranulate from the graphite molding powder for directly cooled fuel compacts as well as for molded block elements.

To be sure these procedures to a limited degree lead to the objective but they are cumbersome, very expensive, and also limit the possibilities of obtaining industrial production. Furthermore, individual properties are made worse thereby. Thus, for example, the tensile strength of a graphite molded article is reduced by using isogranulates.

It is also known to use as a filler carbon black which generally is obtained by thermal pyrolyses of gaseous or liquid hydrocarbons, in order thereby to produce isotropic articles. The difficulty here above all is in the extremely fine granularity of the carbon black, which together with its relatively unarranged lattice structure, leads to a very low heat conductivity in the molded article.

It was the problem of the present invention to find a process for the production of graphite molded articles of high isotropy and heat conductivity which avoided the above described disadvantages and difficulties.

This problem was solved according to the invention by producing the graphite or carbon molded article by molding a mixture of a binder and a powdery carbon filler which consists partially or wholly of pyrolytically produced isotropic carbon, with subsequent heat treatment of the molded article. There is used as the filler, an isotropic pyrolytic carbon made by depositing a hydrocarbon on a carbon granulate and then grinding to a particle size of less than 100 μm.

There can be employed any of the conventional binders, e.g., phenolic resins such as phenol-formaldehyde, resin kresole-formaldehyde resin phenol-hexamethylentetramine resin, furfuryl alcohol resin or coal tar pitch.

The amount of binder is not critical. For example, it can be 5 to 30 % by weight of the total of filler and binder.

Contrary to what had generally been expected, it has been surprisingly found that isotropic separated pyrolytic carbon under the conditions referred to after the grinding can be pressed to isotropic articles. This is attributable to the fact that the size of the crystallite is smaller than the grains of the ground powder and that the crystallites are arranged isotropically in the granules and suffer no displacement in the pressing.

A further advantage of the use of pyrolytic carbon of the invention as filler material is that through the deposition conditions referred to not only can the isotropy be set, but also, other properties such as density and crystallite size.

It is known that pyrocarbon layers, which are produced in different deposition conditions show different changes in dimensions corresponding to their respective structure in neutron radiation. Thus, carbon discs of pyrolytic carbon made from methane at 1650° C. exhibit a density of 1.55 g/cm$^3$ by irradiation up to a neutron dose of $2 \times 10^{21}$ cm$^{-2}$ (E>0.18 MeV), at 900° C. irradiation temperature a density increase of 25%, while a pyrolytic carbon made at 2000° C. with a density of 2.0 g/cm$^3$ under the same irradiation conditions only shows a 5% density increase (see, for example, J. C. Bokros et al, J. Nucl. Mat. 31 (1969), page 25).

Therewith there is now a means to influence directly the irradiation behavior of the molded article, that means its changes in dimensions during its residence time in the reactor.

Furthermore, there is the extremely important possibility with the graphite molded articles produced by the invention to adjust the dimensional changes of the matrix under irradiation to the shrinking behavior of the embedded coated particles. Thereby, it becomes possible to avoid the customarily occurring fissures or gaps during the irradiation through different shrinkage between particles and matrix and partially also between fuel free and fuel containing zones.

By the use of isotropic pyrolytic carbon of suitable grain size as fillers it is possible to produce extensively isotropic and good heat conducting molded articles and to so lay out the properties of individual fuel element zones that gap formation can be excluded with certainty during the irradiation.

The production of the pyrolytic carbon of the invention preferably takes place using hydrocarbons in fluidized beds under definite conditions of deposition to granular graphite material of particle size of 0.1 to 10 mm. The pyrolytic deposition takes place with methane at 1400° – 2200° C., with propylene at 1100° – 1700° C, and with acetylene at 1000° – 2000° C. The deposited pyrolytic carbon is then ground and a portion returned to the fluidized bed as basic material.

It is advantageous for the insertion as filler material to produce a pyrolytic carbon which has a density of >1.7 g/cm$^3$ and a Bacon anisotropy factor (BAF) <1.25 (see, Bacon, J. Appl. Chem. 6 (1956), pages 477–481).

As hydrocarbons in addition to methane the most important are propylene and acetylene since there can be separated from them at relatively low temperatures with especially high separation speeds, high density and isotropic carbon. In place of pure methane gas, there can be used natural gas. In place of propylene there can also be used propane, butane and similar hydrocarbons, e.g., ethane, ethylene, butylene and isobutylene.

The deposition of pyrolytic carbon takes place preferably in a fluidized bed since the deposition conditions especially the temperature can be regulated very exactly and held constant in this. However, it is also possible to undertake the deposition continuously or discontinuously in a rotary kiln.

Since the use of the molded articles for high temperature reactor fuel elements requires as high as possible heat conductivity the pyrolytic carbon is only ground so finely that there is formed a molded body structure with homogeneous structure and high density. For this there is required a particle size below 100 $\mu$m. The average particle size being preferably 10 to 60 $\mu$m then in the case most preferred is about 30 $\mu$m. A grinding to an average particle size below 5 $\mu$m would give a finely granular structure and thereby lead to a greatly lowered heat conductivity. This is also the reason why a use of carbon black which generally possesses a particle size below 1 $\mu$m only leads to limitedly useful molded articles.

The grinding process takes place preferably in two steps: the coarse grinding in a hammer mill and the fine grinding in a bounce mill, for example, a pinned disc mill or likewise in a hammer mill. The pyrolytic carbon can be annealed, preferably after the grinding, at temperatures above 2000° C., suitably at about 2500° C, to improve the moldability. In this manner, there is obtained at equal molding pressures shaped articles of higher density.

The annealing can be carried out at temperatures up to 3000° C.

Since the individual grains in the material to be ground are isotropic themselves the shaping of the filler-binder mixture can take place in a stamping press or extruder without the fear of the formation of anisotropic molded articles. However, it can be advantageous to add to the ground pyrolytic carbon up to 400 weight % of said ground pyrolytic carbon, preferably up to 100 % of a natural graphite powder and/or synthetic graphite powder as further filler in order to produce shaped articles with still higher heat conductivity and still better irradiation properties. The natural or synthetic graphite powder can have a average grain size of 10 to 100 $\mu$m. The ground isotropic pyrolytic carbon as filler component, according to its portion in the filler mixture can lead to either a reduction in the anisotropy and therewith an improvement in the irradiation behavior of the shaped article or it makes possible the use of a simpler pressing process than with a filler material of exclusively anisotropic particle material. According to the requirements in regard to the permissible size of the anisotropy factor, for example an intermediate granulation can be omitted or, for example, in place of an isostatic pressing process there can be employed a molding process in a steel die.

In the following production example for a shaped article of low density the improvement of the anisotropy and other properties by using the ground pyrolytic carbon in place of graphite powder is shown.

Unless otherwise indicated all parts and percentages are by weight.

PRODUCTION EXAMPLE 1:

A coarse granulated pyrolytic carbon (particle size 0.5 to 2mm. made in a previous batch) served as starting material. There was deposited on this in a fluidized bed at 2100° C. pyrolytic carbon from methane up to a layer thickness of several hundred $\mu$m. The pyrolytic carbon obtained had a density of 2.0 g/cm$^3$, a Bacon anisotropy factor of 1.15 and a crystallite size $L_c$ of 100 A.

The granules of pyrolytic carbon were ground. The first resulting coarse granule fraction (>0.5 mm) were returned into the fluidized bed for a further deposition of pyrolytic carbon. The residue was ground to a particle size of less than 100 $\mu$m, then as filler kneaded with 20% phenol-formaldehyde resin as binder in alcoholic solution. After evaporation of the solvent, the kneaded mass was ground to a suitable size of less than 500 $\mu$m for the further working. This molding powder was pre-pressed at a very low pressing pressure of 80 kgf/cm$^2$ and a pressing temperature of 150° C. in a die. The shaped article obtained having a diameter of 42 mm and a height of 35 mm. was heated to about 1000° C. to carbonize the phenolic resin binder and annealed in a vacuum at 1800° C. for degassing. The synthetic carbon article thus produced attained a density of 1.4 g/cm$^3$ and a bending strength of 400 kgf/cm$^2$. The anisotropy factor of the thermal expansion was 1.0. In contrast, a synthetic carbon article of comparable density using coke or graphite powder as the filler material under comparable conditions only attained a bending strength of 50 – 120 kgf/cm$^2$ and had a comparably high anisotropy factor of 3 to 4.

PRODUCTION EXAMPLE 2:

A pyrolytic carbon powder was produced like in example 1. After mixing the pyrolytic carbon powder with natural graphite powder (addition in an amount of 20 weight % of the pyrolytic carbon powder) phenol-formaldehyde resin (in alcoholic solution) has been added in an amount of 25% of the filler mixture in a kneader and mixed therein for 30 minutes.

After evaporation of the solvent the kneaded mass was ground to a grain size of less than 500 $\mu$m for the further working.

Pressing of this powder and heat treatment of the resulting body had been done like in example 1.

Density of the so produced synthetic carbon article attained 1.5 g/cm$^3$ and bending strength 400 kgf/cm$^2$. The anisotropy factor was 1.2.

The use of ground isotropic pyrolytic carbon is especially suitable as filler material in the production of composite articles which include the fuel containing and fuel free zones.

For example, for production of a directly cooled cylindrical fuel compact, the fuel containing nucleus of (U, Th) O$_2$ particles coated with the pyrolytic carbon, which are jacketed by the necessary amount of a binder containing graphite powder, was first rough pressed at low pressure to a hollow cylinder.

For the production of the fuel free jacket part according to the invention a mixture of graphite powder, ground isotropic pyrolytic carbon and binder resin, e.g., phenolformaldehyde resin was rough pressed to outer and inner jacket cylinders and to annular upper and lower stop plates and then after joining these individual parts of the entire fuel-composite finished pressed at high pressure. By formulation of the constituent amounts of ground pyrolytic carbon, there was synchronized the shrinking behavior of the jacket zone to that of the fuel containing zone at the subsequent temperature treatment of the composite article at 1800° – 2000° C., so that there was formed a gap free matrix structure in the entire compact. By synchronizing the density and the structural properties of the pyrolytic carbon of the particle coating, it is possible to attain a considerable improvement in resistance to irradiation.

In similar manner, there can also be produced, other types of prismatic or spherical fuel elements in which the distinctions between fuel containing and fuel free zone can be abolished or sufficiently reduced by the controlled use of ground isotopic pyrolytic carbon with defined properties as filler material.

What is claimed is:

1. A process of producing isotropic pyrolytic carbon particles of high heat conductivity comprising pyrolyzing a hydrocarbon gas on isotropic carbon granulates to form a deposit of isotropic pyrolytic carbon on the isotropic carbon granulates having a particle size above 100μm and then grinding to form an isotropic carbon powder having a particle size below 100μm and an average particle size larger than 5 μm.

2. A process according to claim 1, wherein the ground powder particles have an average particle size of between 15 and 60 μm.

3. A process according to claim 2, wherein the average particle size is about 30 μm.

4. A process according to claim 1, wherein the hydrocarbon gas is methane, propylene or acetylene.

5. A process according to claim 1, wherein the depositing is carried out in a fludized bed and there are included the steps after grinding of separating coarse particles having a particle size above 100 μm and returning the coarse particles to the fluidized bed as granulates for deposition of isotropic, pyrolytic carbon thereon.

6. A process according to claim 5 wherein the isotropic carbon powder having a particle size below 100 μm is annealed at a temperature above 2000° C.

7. A process according to claim 6, wherein the annealing is at a temperature of up to 2500° C.

8. A process according to claim 1 wherein the isotropic carbon powder having a particle size below 100μm is annealed at a temperature above 2000° C.

9. A process according to claim 8 wherein the annealing is at a temperature of up to 2500° C.

* * * * *